A. M. BROWN.
Friction-Clutches
No. 150,653.
Patented May 5, 1874.
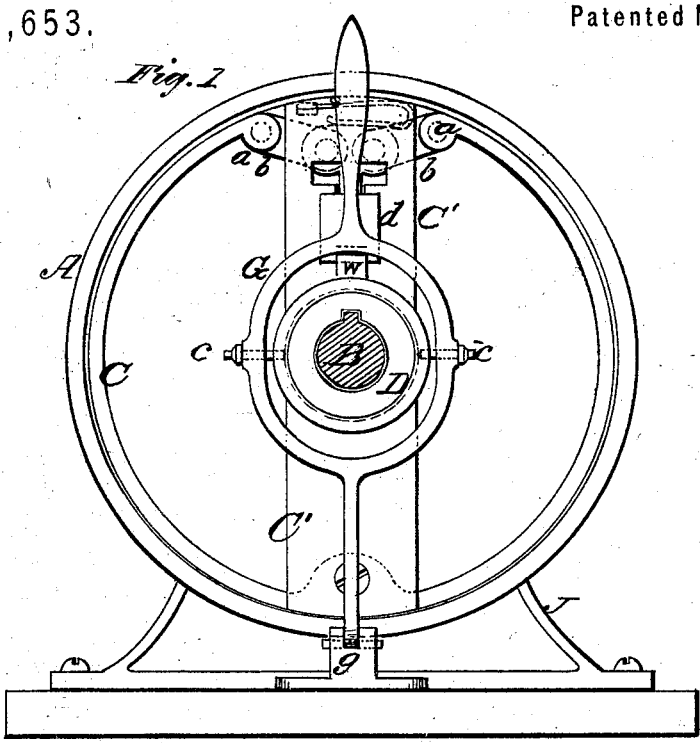
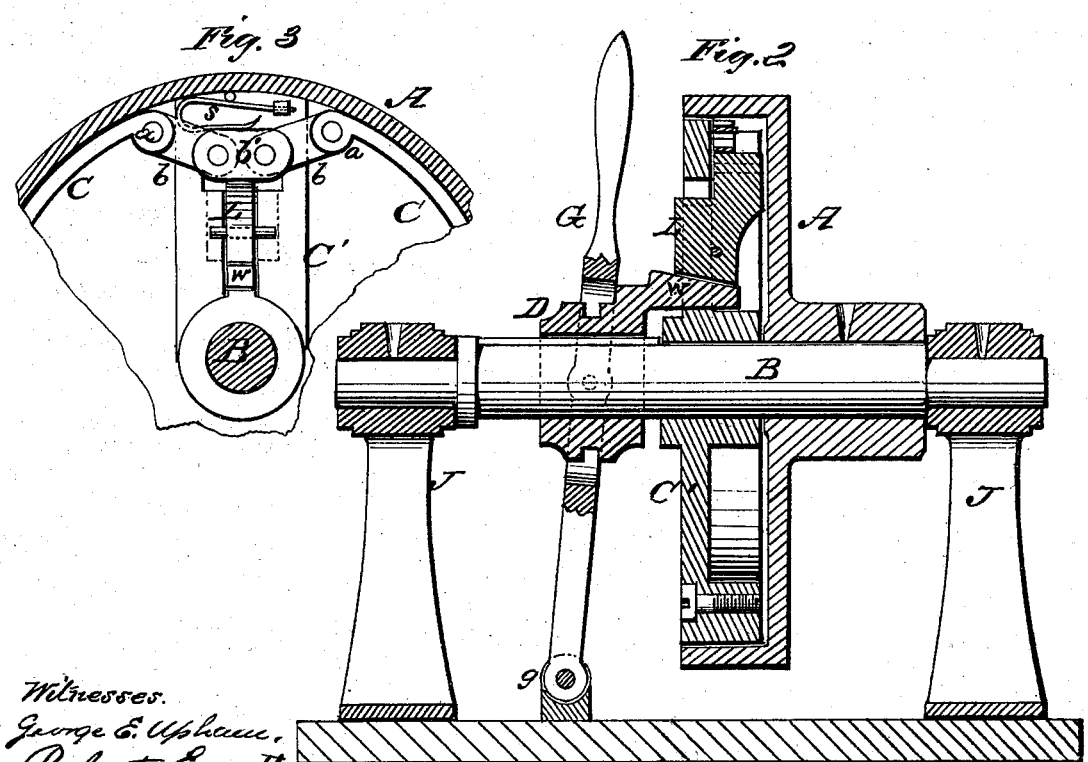

UNITED STATES PATENT OFFICE.

ALFRED M. BROWN, OF PAWTUCKET, RHODE ISLAND.

IMPROVEMENT IN FRICTION-CLUTCHES.

Specification forming part of Letters Patent No. 150,653, dated May 5, 1874; application filed April 11, 1874.

*To all whom it may concern:*

Be it known that I, ALFRED M. BROWN, of Pawtucket, in the county of Providence and State of Rhode Island, have invented a new and valuable Improvement in Friction Clutches or Pulleys; and I do hereby declare that the following is a full, clear, and exact description of the construction and operation of the same, reference being had to the annexed drawings, making a part of this specification, and to the letters and figures of reference marked thereon.

Figure 1 of the drawing is a representation of my friction-clutch, and Fig. 2 is a sectional view of the same. Fig. 3 is a detail section of the same.

This invention has relation to pulleys which can be made fast or loose on their shafts by means of friction clutches or carriers. It consists in the combination of a spring with toggles, slide-clutch, and wedge, as will be hereinafter more fully described.

In the annexed drawing, A designates a pulley which is loosely applied on a shaft, B, having its bearings in hangers or standards J. Inside of the rim of this pulley is applied a friction-clutch, C, which is nearly a complete circle, and to which one end of a diametrical bar, C', is rigidly secured. This bar C' is secured to the shaft B, so as to turn with it. The two free ends of the clutch are connected by toggles $b$ $b$ to the T-shaped head $b'$ of a slide, L, which slide is guided in a slot made through the bar C', so that it can receive a radial movement. Between the slide L and the hub of the bar C' is a wedge, $w$, which is movable in a direction with the length of the shaft B, and which is formed on or secured to a circular grooved hub, D. This hub D is applied on shaft B by means of a spline and key-seat, so that it is allowed to receive endwise movement, which movement is imparted to it by means of a yoked lever, E, pivoted at $g$, and provided with pins $c$ $c$, which enter the said circular groove. When the lever G is moved to the position indicated in Fig. 2, the wedge $w$ will force the slide L toward the circumference of the pulley A, and cause the toggles $b$ $b$ to expand the clutch C against the inner side of the rim of the pulley, thereby firmly clutching the latter on its shaft. When the wedge $w$ is drawn back the clutch C will contract by its own elasticity, and free itself from the rim of the pulley, thereby allowing the latter to turn loosely on its shaft. A bow-spring, S, is applied between the slide L and the rim of pulley, and is united to the next section of track.

What I claim as new, and desire to secure by Letters Patent, is—

The combination of the spring $s$, with the slide L, toggles $b$ $b$, clutch C, and wedge $w$, operating as described.

In testimony that I claim the above I have hereunto subscribed my name in the presence of two witnesses.

ALFRED MATHIS BROWN.

Witnesses:
  JOSHUA S. WHITE,
  FRED. H. WHITE.